(12) United States Patent
Kwon et al.

(10) Patent No.: US 8,458,389 B2
(45) Date of Patent: Jun. 4, 2013

(54) APPARATUS AND METHOD FOR CONVERTING PROTOCOL INTERFACE

(75) Inventors: Kwon Taek Kwon, Seoul (KR); Seok Yoon Jung, Seoul (KR); Hyuk Jae Lee, Seoul (KR); Kyu Dong Kim, Seoul (KR)

(73) Assignees: Samsung Electronics Co., Ltd., Suwon-Si (KR); SNU R&DB Foundation, Seoul (KR)

( * ) Notice: Subject to any disclaimer, the term of this patent is extended or adjusted under 35 U.S.C. 154(b) by 328 days.

(21) Appl. No.: 12/923,669

(22) Filed: Oct. 1, 2010

(65) Prior Publication Data
US 2011/0164692 A1 Jul. 7, 2011

(30) Foreign Application Priority Data
Jan. 6, 2010 (KR) .................. 10-2010-0000789

(51) Int. Cl.
*G06F 13/00* (2006.01)

(52) U.S. Cl.
USPC ........................................ 710/315

(58) Field of Classification Search
USPC ........................................ 710/315
See application file for complete search history.

(56) References Cited

U.S. PATENT DOCUMENTS

| 7,412,550 | B2 * | 8/2008 | Joe et al. | 710/110 |
| 2006/0080492 | A1 * | 4/2006 | Choi et al. | 710/315 |
| 2007/0101043 | A1 * | 5/2007 | Herman | 710/315 |
| 2007/0130409 | A1 * | 6/2007 | Matsuse et al. | 710/308 |
| 2007/0198762 | A1 * | 8/2007 | Xiong | 710/315 |
| 2011/0029696 | A1 * | 2/2011 | Uehara | 710/9 |

FOREIGN PATENT DOCUMENTS

| KR | 2004-0066587 | 7/2004 |
| KR | 2005-0037220 | 4/2005 |
| KR | 2005-0114890 | 12/2005 |
| KR | 2008-0110034 | 12/2008 |

OTHER PUBLICATIONS

Bill Lin et al., "Synthesis of Concurrent System Interface Modules with Automatic Protocol Conversion Generation", IMEC, Kapeldreef 75, B-3001 Leuven, Belgium, Email: {billlin,vercaut}@imec.be.

* cited by examiner

*Primary Examiner* — Glenn A Auve
(74) *Attorney, Agent, or Firm* — Staas & Halsey LLP (57) ABSTRACT

An apparatus and method for converting a protocol interface are provided. A protocol converter may analyze a protocol of protocol data, and may sequentially output a plurality of sub-data of the input protocol data according to types of the plurality of sub-data and a plurality of phase information representing the types of the plurality of sub-data. A phase channel line may transmit phase information received from the protocol converter among the plurality of phase information. A data channel line may simultaneously transmit the received phase information and a sub-data corresponding to the received phase information.

16 Claims, 10 Drawing Sheets

APPARATUS AND METHOD FOR CONVERTING PROTOCOL INTERFACE

CROSS-REFERENCE TO RELATED APPLICATION

This application claims the benefit of Korean Patent Application No. 10-2010-0000789, filed on Jan. 6, 2010, in the Korean Intellectual Property Office, the disclosure of which is incorporated herein by reference.

BACKGROUND

1. Field

Embodiments of the following description relate to an apparatus and method for converting a protocol interface, and more particularly, to an apparatus and method for converting a protocol interface that may convert an interface for a variety of protocols to be transmitted using phase information.

2. Description of the Related Art

An apparatus where a variety of protocols are mixed employs different system buses for each protocol to individually use protocols. To simplify the bus system, different protocols may be converted to a single protocol so that the bus system may be unified. However, in this instance, a plurality of protocol interface converters may be used, or a portion of functions defined in each protocol may not be used. Thus, it is difficult to make an apparatus employing various protocols to be combined in a single system with a single interface, and as a result, buses may be separated according to functions of protocols, thereby reducing a system efficiency.

SUMMARY

The foregoing and/or other aspects are achieved by providing an apparatus for converting a protocol interface, the apparatus including a protocol converter to analyze a protocol of input protocol data, and to sequentially output a plurality of sub-data of the input protocol data according to types of the plurality of sub-data, the plurality of sub-data and a plurality of phase information representing the types of the plurality of sub-data being output; a phase channel line to transmit phase information received from the protocol converter among the plurality of phase information; and a data channel line to simultaneously transmit, to the phase channel line, the received phase information and a sub-data corresponding to the received phase information.

When the input protocol data contains a valid signal, the protocol converter generates phase information corresponding to the protocol.

The protocol converter may include a protocol analyzer to analyze the protocol and to determine an occurrence of a phase corresponding to the protocol; a separator to separate the input protocol data into the plurality sub-data based on a result of the determining, and to sequentially output the plurality of sub-data and a plurality of phase information respectively corresponding to the plurality of sub-data; and a phase channel generator to output, to the phase channel line, phase information received from the separator among the plurality of phase information; and a data channel generator to output, to the data channel line, a sub-data corresponding to the received phase information among the plurality of sub-data.

Each of the plurality of sub-data may include at least one of information data, address data, and actual data, and each of the plurality of phase information may include at least one of an information phase, an address phase and a data phase.

The protocol may include an Advanced eXtensible Interface (AXI) protocol using a parallel data transmission method.

When at least two channel data is input in parallel through at least two channels, the protocol converter may sequentially output a plurality of phase information corresponding to a plurality of sub-data of the at least two channel data. Here, the plurality of sub-data may be output simultaneously with the plurality of phase information.

The protocol converter may define different phase information based on a type of a transmission method.

The protocol converter may combine the information phase and the address phase in phase information by expanding the data channel line, and may output the information data and the address data to the data channel line when the combined phase information is output to the phase channel line.

The protocol may include an Advanced High-performance Bus (AHB) protocol using a sequential data transmission method.

Each of the plurality of sub-data may include command data and actual data, and each of the plurality of phase information may include a command phase and an actual data phase.

The protocol may include a Secure Digital Input/Output (SDIO) interface protocol using a data transmission between chips.

The foregoing and/or other aspects are achieved by providing a method for converting a protocol interface, the method including analyzing a protocol of input protocol data, and determining an occurrence of a phase corresponding to the protocol; separating the input protocol data into a plurality of sub-data based on a result of the determining; sequentially outputting, to a phase channel line, a plurality of phase information respectively corresponding to the plurality of sub-data; and sequentially outputting, to a data channel line, the plurality of sub-data when the plurality of phase information are output to the phase channel line.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
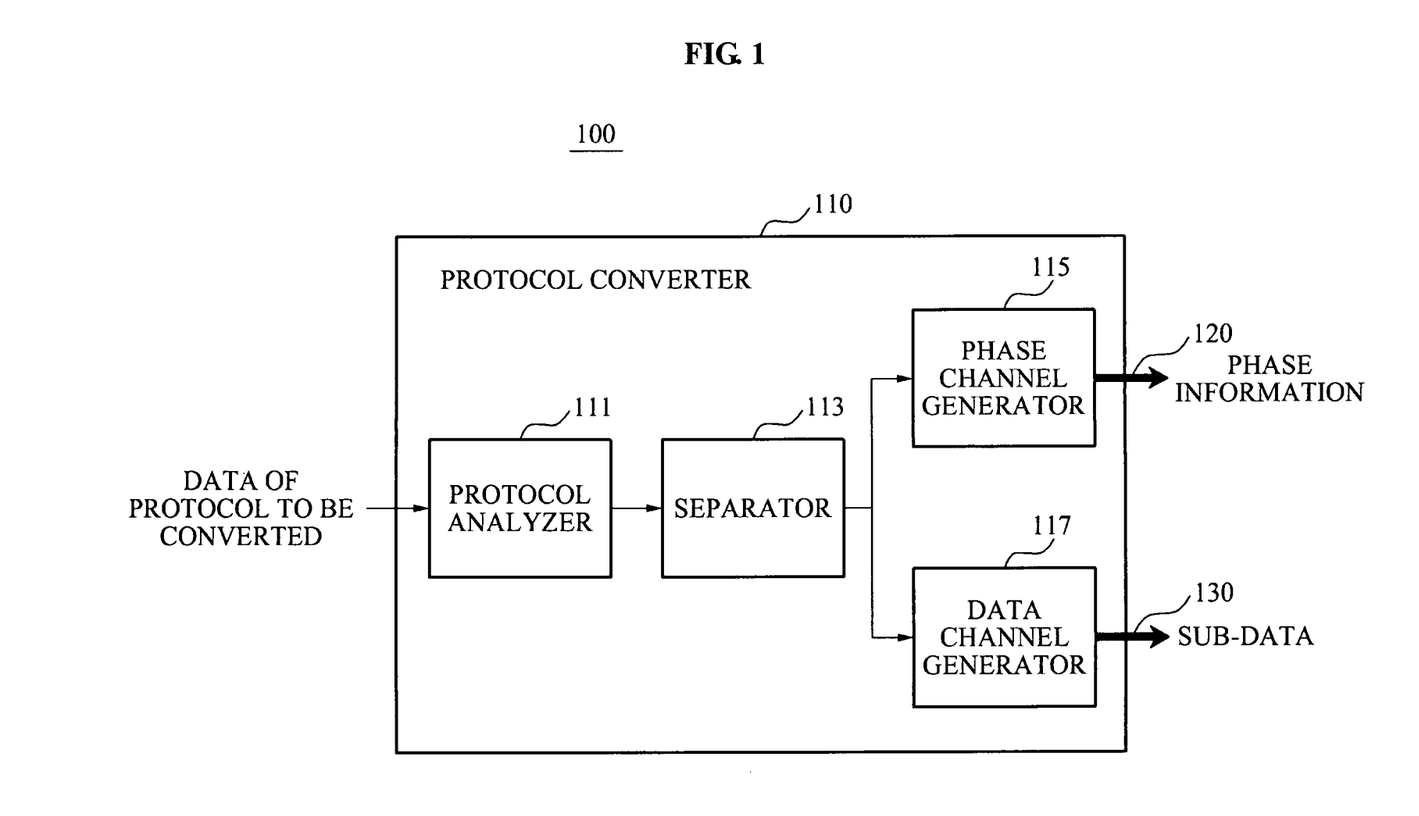
FIG. 1 illustrates a block diagram of a protocol interface converting apparatus according to embodiments.

FIG. 1 illustrates a block diagram of a protocol interface converting apparatus 100 according to embodiments.

The protocol interface converting apparatus 100 of FIG. 1 may integrate information defined in each protocol into an information channel, for example a phase, and may convert various protocol interfaces to a single protocol interface using the same signal line. Accordingly, the protocol interface converting apparatus 100 of FIG. 1 may include a protocol converter 110, a phase channel line 120, and a data channel line 130, as shown in FIG. 1.

The protocol converter 110 may analyze input "data of a protocol to be converted" (hereinafter, referred to as "protocol data"), and may sequentially output a plurality of sub-data of the input protocol data based on types of the plurality of sub-data. In this instance, the plurality of sub-data and a plurality of phase information may be output simultaneously. The plurality of phase information may represent the types of the plurality of sub-data, and may respectively correspond to the plurality of sub-data. In other words, the protocol converter 110 may output the plurality of sub-data and the plurality of phase information at the same time. When the input protocol data contains a valid signal, the protocol converter 110 may generate a plurality of phase information corresponding to the protocol.

The phase channel line 120 may be a signal line to transmit phase information received from the protocol converter 110 among the plurality of phase information generated by the protocol converter 110.

The data channel line 130 may be a signal line to simultaneously transmit the sub-data corresponding to the received phase information.

The protocol converter 110 may include a protocol analyzer 111, a separator 113, a phase channel generator 115, and a data channel generator 117.

The protocol analyzer 111 may receive input protocol data, may analyze a protocol of the input protocol data, and may generate phase information corresponding to the protocol. For example, when write address channel data of an Advanced eXtensible Interface (AXI) protocol is input, the protocol analyzer 111 may generate a phase "write address". Specifically, when a valid signal (for example, AWVALID) generated by the write address channel is input through a valid signal line (not shown), the protocol analyzer 111 may determine an occurrence of a phase "write address". Also, the protocol analyzer 111 may output phase information and protocol data to the separator 113.

The separator 113 may separate a signal received from the protocol analyzer 111 into phase information and protocol data, and may separate the protocol data into a plurality of sub-data based on an attribute and type of the protocol data. Also, the separator 113 may generate a plurality of phase information used to represent types of the plurality of sub-data. Hereinafter, the generated phase information may be referred to as "sub-phase information".

The separator 113 may sequentially transfer the plurality of sub-phase information to the phase channel generator 115, and may sequentially transfer the plurality of sub-data items respectively corresponding to the plurality of sub-phase information items to the data channel generator 117. The separator 113 may simultaneously transfer current sub-phase information among the plurality of sub-phase information, and a sub-data corresponding to the current sub-phase information to the phase channel generator 115 and the data channel generator 117, respectively.

The phase channel generator 115 may output, to the phase channel line 120, the sub-phase information received from the separator 113.

The data channel generator 117 may output, to the data channel line 130, the sub-data received from the separator 113.

Figure 2:
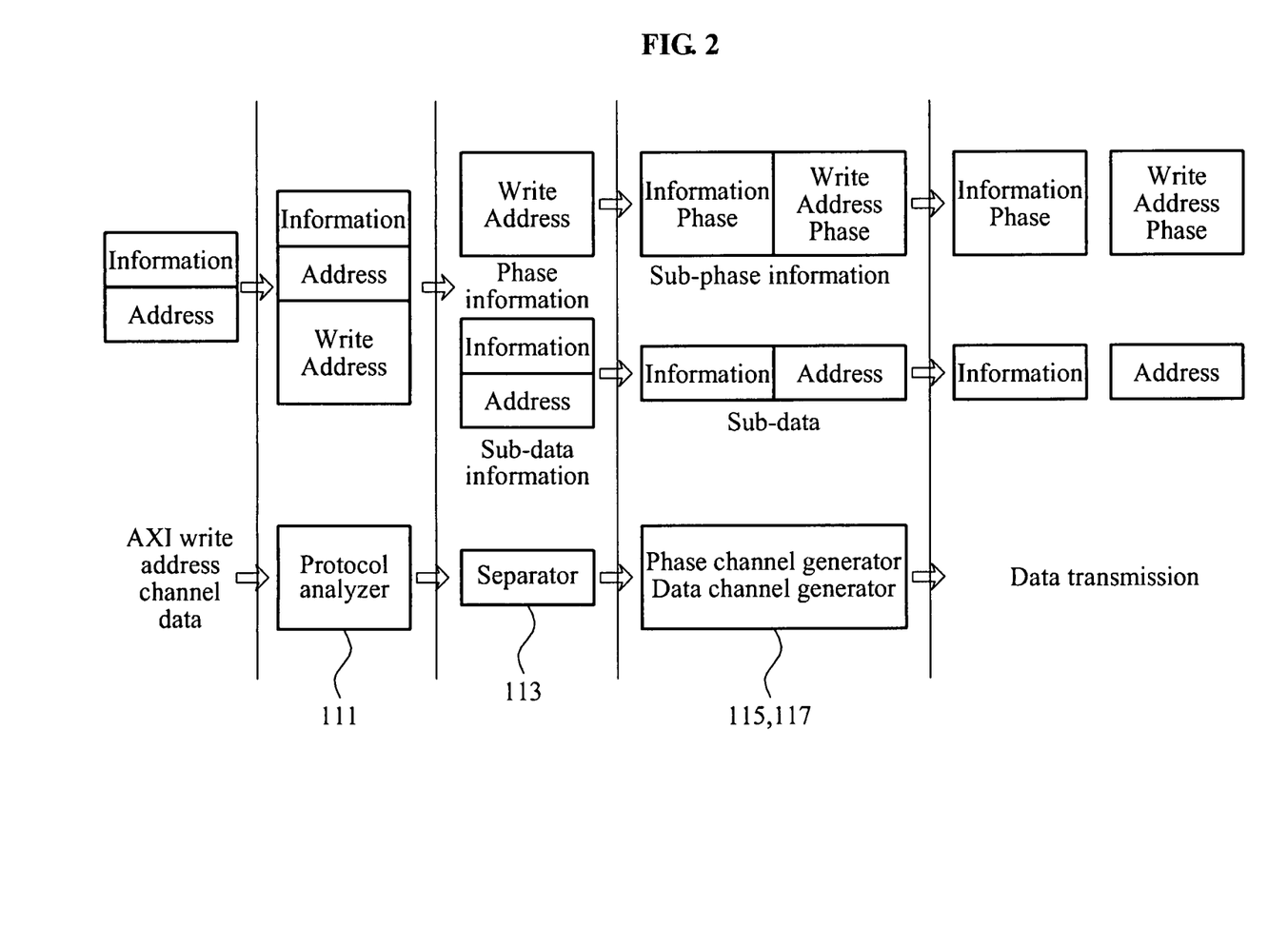
FIG. 2 illustrates an operation of converting a signal of an Advanced eXtensible Interface (AXI) protocol in a protocol converter according to an embodiment.

FIG. 2 illustrates an operation of converting a signal of an AXI protocol in a protocol converter according to an embodiment.

The AXI protocol may include a write address channel, a read address channel, a write data channel, a read data channel, and a write response channel. Each of the channels has a "ready" signal and a "valid" signal to indicate that the channels are ready to perform their respective operations. As shown in FIG. 2, AXI write address channel data is input to the protocol analyzer 111.

Data of the AXI protocol may include a plurality of sub-data, for example, information data, address data, and actual data (not shown). The information data may be related to an attribute of the actual data and used to control the actual data, and the address data may be related to an address used to record or read the actual data. The actual data may be data capable of being actually read or recorded. The information data and the address data may be input simultaneously or individually, and the actual data may be then input. FIG. 2 illustrates an example where the information data and the address data are input simultaneously.

The protocol analyzer 111 may analyze the input write address channel data, that is, input channel data may determine that the phase "write address" occurs, and may then determine types of sub-data of the input write address channel data.

The separator 113 may separate a signal received from the protocol analyzer 111 into phase information and the channel data, and may separate the channel data into the information data and the address data. The separator 113 may recognize the occurrence of the phase "write address" based on the separated phase information, may generate sub-phase information, for example an information phase and a write address phase, and may sequentially transfer the generated sub-phase information to the phase channel generator 115. Here, the information phase and the write address phase may represent the information data and the address data, respectively.

The separator 113 may simultaneously transfer the information phase and the information data to the phase channel generator 115 and the data channel generator 117, respectively. Also, after transferring both the information phase and the information data, the separator 113 may simultaneously transfer the address phase and the address data to the phase channel generator 115 and the data channel generator 117, respectively.

Accordingly, the information phase and the information data may be transmitted from the phase channel generator 115 and the data channel generator 117 to each other different buses in an on-chip. Also, the write address phase and the address data may be transmitted from the phase channel generator 115 and the data channel generator 117 to each other different buses in an on-chip.

Figure 3:
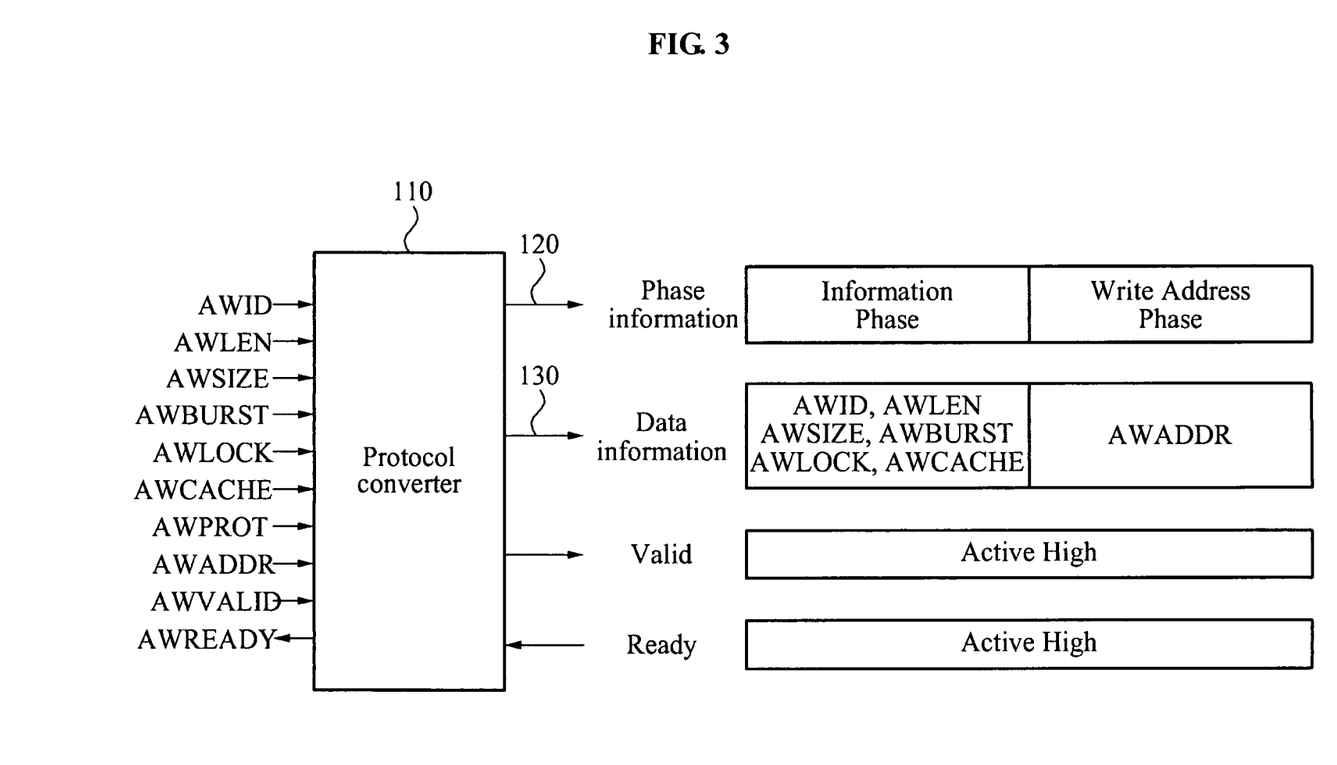
FIG. 3 illustrates an example where an AXI protocol is converted based on phase information of a protocol converter and data is transmitted according to an embodiment.

FIG. 3 illustrates an example where an AXI protocol is converted based on phase information of a protocol converter and data is transmitted according to an embodiment.

Write address channel data of the AXI protocol may include AWID, AWLEN, AWSIZE, AWBURST, AWLOCK, AWCACHE, AWPROT, AWADDR, AWVALID, and AWREADY.

AWID, AWLEN, AWSIZE, AWBURST, AWLOCK, and AWCACHE may correspond to information data, and AWADDR may correspond to address data. AWID may indicate identification information, AWLEN may include information on a number of actual data, and AWSIZE may include information on a size of actual data. AWVALID and AWREADY may be used to determine whether data transmission is available. For example, when information indicating validity is set in AWVALID, the protocol converter 110 may query a receiver as to whether the receiver is ready to receive data of a current protocol. In this instance, when a ready signal indicating that the receiver is able to receive the data is received from the receiver, that is, when AWREADY is in an "active high" state, the protocol converter 110 may convert an interface of the current protocol so that data may be transmitted.

Referring to FIGS. 2 and 3, the AXI write address channel data includes the information data and the address data and thus, the phase information may be defined by the information phase and the write address phase. Accordingly, the protocol converter 110 may analyze the input AXI write address channel data, and may sequentially generate and output the information phase and the write address phase to the phase channel line 120. In particular, the protocol converter 110 may output the information phase, AWID, AWLEN, AWSIZE, AWBURST, AWLOCK, and AWCACHE. Also, the protocol converter 110 may output the write address phase and AWADDR.

Figure 4:
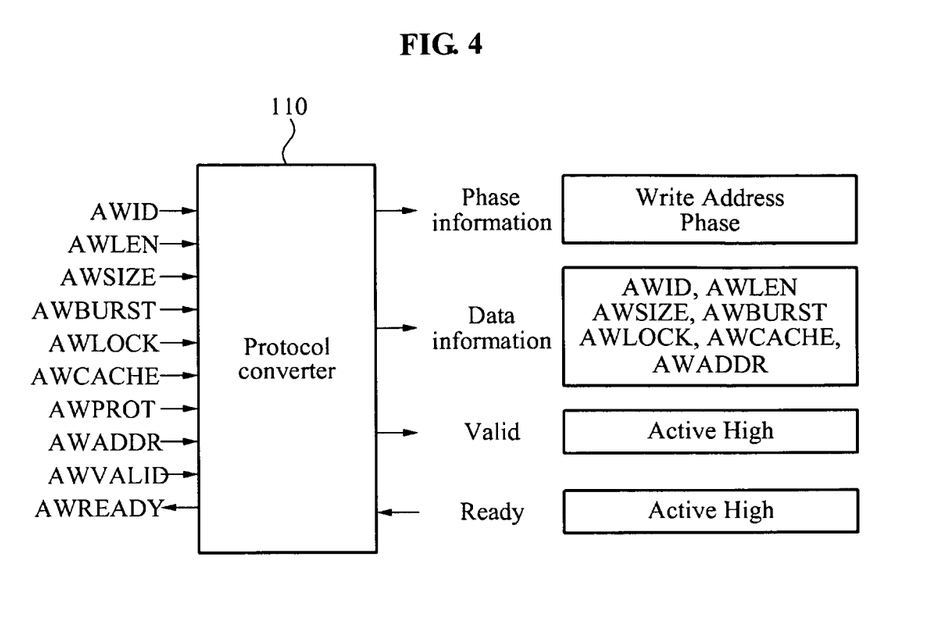
FIG. 4 illustrates another example where an AXI protocol is converted based on phase information of a protocol converter and data is transmitted according to an embodiment.

FIG. 4 illustrates another example where an AXI protocol is converted based on phase information of a protocol converter and data is transmitted according to an embodiment.

As described above with reference to FIG. 3, the information data and the address data may be transmitted with the information phase and the write address phase, respectively. Referring to FIG. 4, information data and address data may be transmitted with phase information, by expanding a data channel signal line used to transmit channel data or sub-data.

Referring to FIGS. 2 and 4, when a number of data channel signal lines is increased, a large amount of data may be transmitted. Specifically, the protocol converter 110 may analyze the input write address channel data, may generate a combined phase information "write address", and may output the combined phase information. Also, the protocol converter 110 may output AWID, AWLEN, AWSIZE, AWBURST, AWLOCK, AWCACHE, and AWADDR, when the combined phase information is generated. In this situation, AWID, AWLEN, AWSIZE, AWBURST, AWLOCK, and AWCACHE may be simultaneously output with AWADDR through different signal lines.

As described above with reference to FIGS. 3 and 4, the protocol converter 110 may define different phase information based on a type of a transmission method. The protocol converter 110 may combine the information phase and the write address phase in a single phase information (for example, write address phase) by expanding the data channel line. Also, the protocol converter 110 may output AWID, AWLEN, AWSIZE, AWBURST, AWLOCK, AWCACHE, and AWADDR to the data channel line 130 at the same time when the combined phase information is output to the phase channel line 120.

A protocol, such as an AXI protocol, may separate channels and transmit the separated channels, so that information of each of the channels may be classified. Accordingly, when the protocol is transmitted, a number of signal lines of the entire system may be increased. According to an embodiment, phase information and sub-data corresponding to the phase information may be transmitted based on the phase information, and thus the channels of the AXI protocol may be combined to transfer information. In other words, the use of the AXI protocol may enable protocol data to be transmitted using a minimum number of signal lines (for example, the phase channel line 120 and the data channel line 130).

Figure 5:
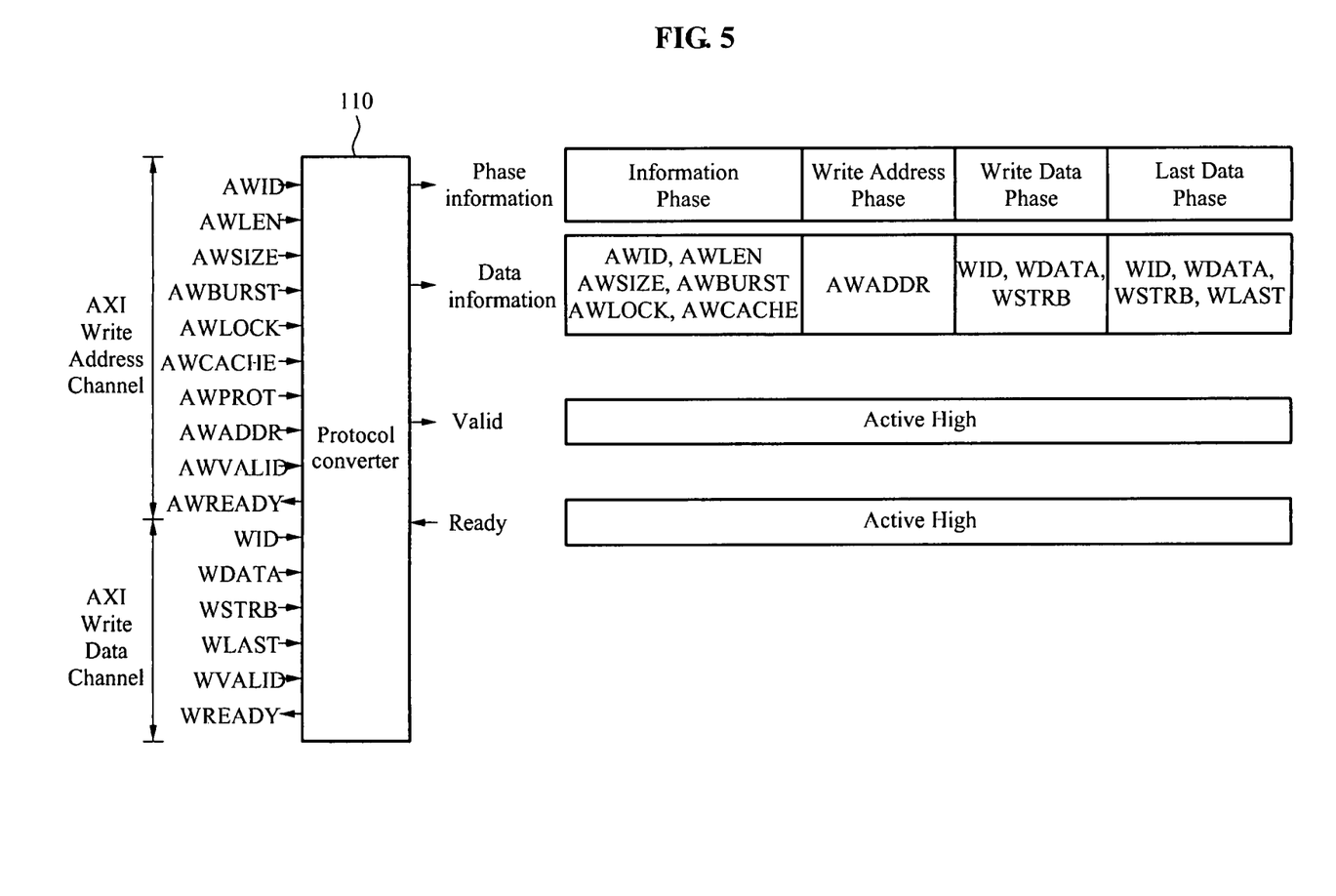
FIG. 5 illustrates an example of transmitting data of an AXI protocol over two channels of an AXI protocol according to another embodiment.

FIG. 5 illustrates an example of transmitting data of an AXI protocol over two channels of an AXI protocol according to another embodiment.

Referring to FIG. 5, AXI write address channel data and AXI write data channel data are input to the protocol converter 110. The AXI write data channel data may include WID, WDATA, WSTRB, WLAST, WVALID, and WREADY. WDATA refers to data which is actually transferred from an AXI master to a slave and has a fixed number of bits, for example, 8, 16 or 32 bits. WLAST refers to a 1-bit flag indicating the last data transfer. Accordingly, the AXI master may provide different signal lines for WDATA and WLAST, and WLAST may have a valid value at the same time when WDATA is provided last. WID and WSTRB indicate additional information of WDATA. WSTRB may form a pair with WDATA, and may provide strobe information for every actual data.

A last data phase signifies that the last data value is provided among a WDATA lane with a length set by WLEN (not shown), and will be described below. Specifically, when the last data phase is output, last actual data, namely WDATA, and last strobe information, namely WSTRB, may also be output. Here, a value of WLAST may be determined to be contained in the phase information.

When actual data other than the last actual data is transmitted, a write data phase may occur. In this instance, WDATA and WSTRB may be transmitted sequentially according to a number of WDATA and WSTRB set by WLEN or a number of bits of WDATA and WSTRB.

The protocol converter 110 may combine the write address channel and the write data channel in a single channel, and may transmit the combined channel. Thus, it is possible to reduce a total number of signal lines and to convert an interface which transmits each channel information using a phase channel. The protocol converter 110 may define the information phase and the write address phase, to transmit the write address channel. Also, the protocol converter 110 may define the write data phase and the last data phase, to transmit the write data channel.

In other words, the protocol converter 110 may simultaneously output the information phase, and AWID, AWLEN, AWSIZE, AWBURST, AWLOCK and AWCACHE of the write address channel. Also, the protocol converter 110 may simultaneously output the write address phase, and AWADDR of the write address channel. Likewise, the protocol converter 110 may simultaneously output the write data phase, and WID, WDATA and WSTRB. Also, the protocol converter 110 may simultaneously output the last data phase, and WID, WDATA, WSTRB and WLAST.

As described above with reference to FIG. 5, when at least two channel data are input in parallel through at least two channels, the protocol converter 110 may sequentially output a plurality of phase information corresponding to a plurality of sub-data of the at least two channel data. In this instance, the plurality of sub-data may be output simultaneously with the plurality of phase information. Therefore, it is possible to transmit information of a plurality of channels using a signal line used for phase transmission and a signal line used for data transmission, without using signal lines used to respectively transmit each channel information.

Figure 6:
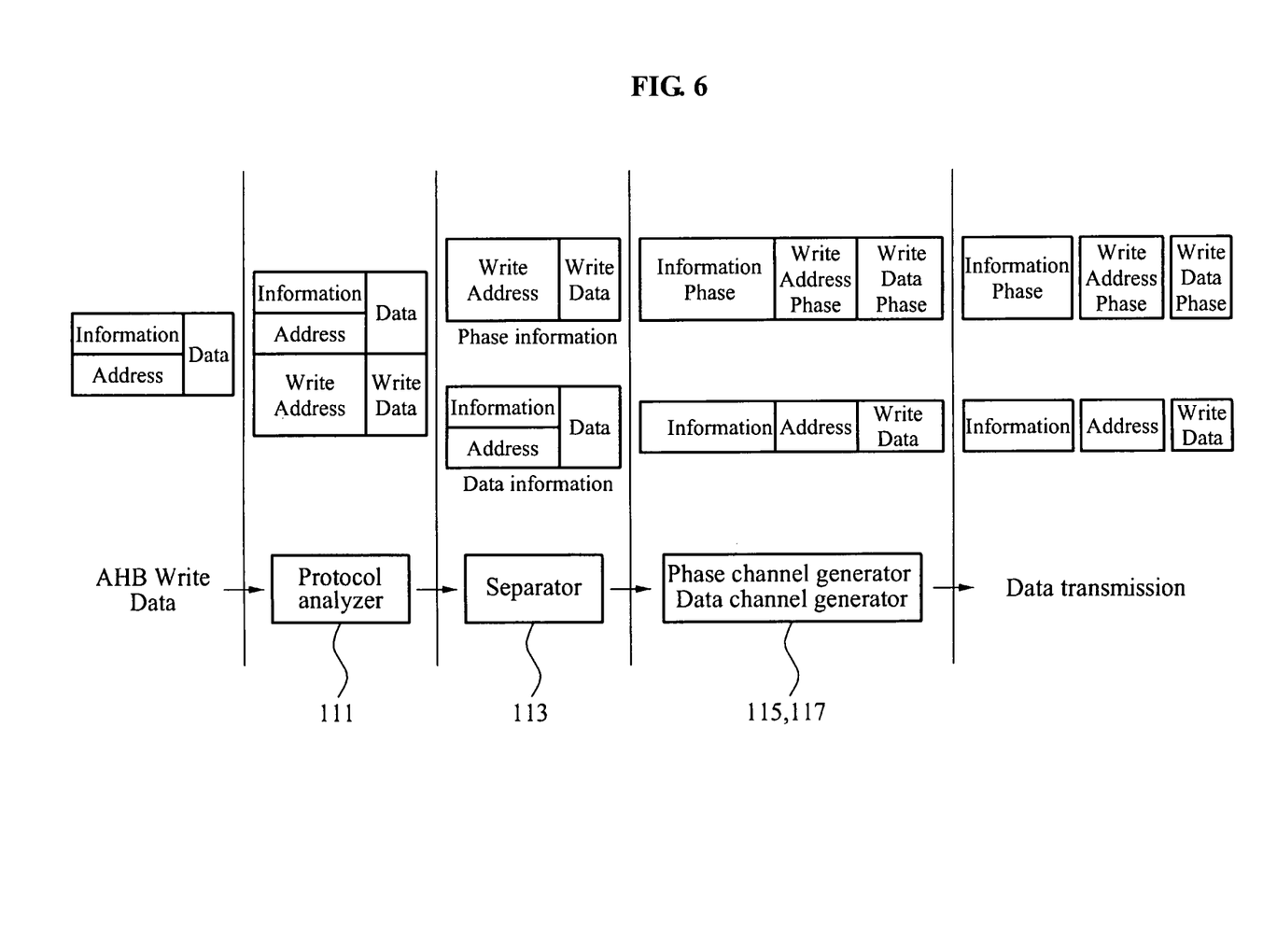
FIG. 6 illustrates an operation of converting a signal of an Advanced High-performance Bus (AHB) protocol in a protocol converter according to an embodiment.

FIG. 6 illustrates an operation of converting a signal of an Advanced High-performance Bus (AHB) protocol in a protocol converter according to an embodiment.

The AHB protocol may sequentially transmit data. Specifically, the AHB protocol may generate a write address of data to be transmitted, and may sequentially transmit data to be recorded using the write address. Data of the AHB protocol may include a plurality of sub-data, for example, information data, address data, and actual data, namely write data. In FIG. 6, the sub-data may be input to the protocol converter 110 in the order of the information data, the address data, and the write data. However, it is understood that the order may be changed. The protocol converter 110 may generate phase information based on the order of input sub-data, and may convert a protocol interface.

The protocol analyzer 111 may count HREADY, and may extract the write address, information data, and write data. Here, the counted HREADY refers to a ready signal indicating that a data of an AHB is valid. Specifically, to determine whether the write data is successfully transmitted, the protocol analyzer 111 may count HREADY indicating valid.

When the address phase and information phase occur, the write address and information data may be extracted, and then data to be transmitted may be extracted. As shown in FIG. 6, when the information data and the address data are first provided and when a number of data to be transmitted by HBURST (see FIG. 9) among the information data is set, actual data may be sequentially input based on the set number of data. Accordingly, the protocol analyzer 111 may count only the number of actual data.

The separator 113 may separate a signal received from the protocol analyzer 111 into phase information including the write address and the write data, and protocol data, and may separate the protocol data into the plurality of sub-data, for example the information data, the address data, and the actual data. The separator 113 may also separate the write address into the information phase and the write address phase, which respectively correspond to the information data and the address data, and may sequentially transfer the information phase and the write address phase to the phase channel generator 115. Subsequently, the separator 113 may transfer the write data phase corresponding to the write data to the phase channel generator 115.

Also, the separator 113 may transfer the information data, the address data, and the write data to the data channel generator 117, while transferring the information phase, the write address phase, and the write data phase to the phase channel generator 115.

Accordingly, the information phase and the information data may be transmitted from the phase channel generator 115 and the data channel generator 117 to each other different buses in an on-chip. Also, the write address phase and the address data may be transmitted from the phase channel generator 115 and the data channel generator 117 to each other different buses in an on-chip. The write data phase and the write data may be transmitted from the phase channel generator 115 and the data channel generator 117 to each other different buses in an on-chip.

Figure 7:
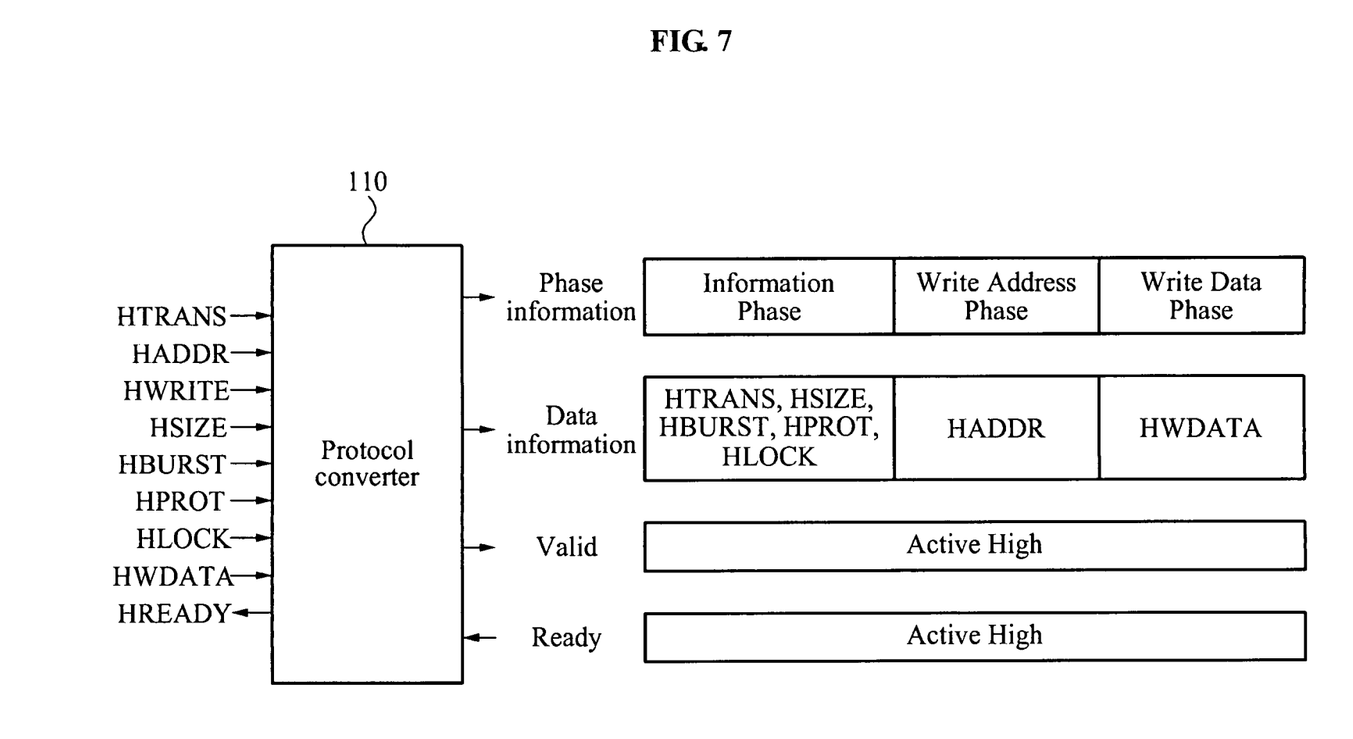
FIG. 7 illustrates an example where an AHB protocol is converted based on phase information of a protocol converter and data is transmitted according to an embodiment.

FIG. 7 illustrates an example where an AHB protocol is converted based on phase information of a protocol converter and data is transmitted according to an embodiment.

In a write operation, data of the AHB protocol may include HTRANS, HADDR, HWRITE, HSIZE, HBURST, HPRTO, HLOCK, HWDATA, and HREADY. Referring to FIGS. 6 and 7, the AHB protocol may include the information data, the address data, and the write data, and thus the protocol converter 110 may define the information phase, the write address phase, and the write data phase, to express the write operation of the AHB protocol.

The protocol converter 110 may analyze the input data of the AHB protocol, and may sequentially generate and output the information phase, the write address phase, and the write data phase. Specifically, the protocol converter 110 may simultaneously output the information data, for example HTRANS, HSIZE, HBURST, HPRTO and HLOCK, when the information phase occurs. Also, the protocol converter 110 may simultaneously output the address data, for example HADDR, when the write address phase occurs. The protocol converter 110 may simultaneously output the write data, for example HWDATA, when the write data phase occurs.

Figure 8:
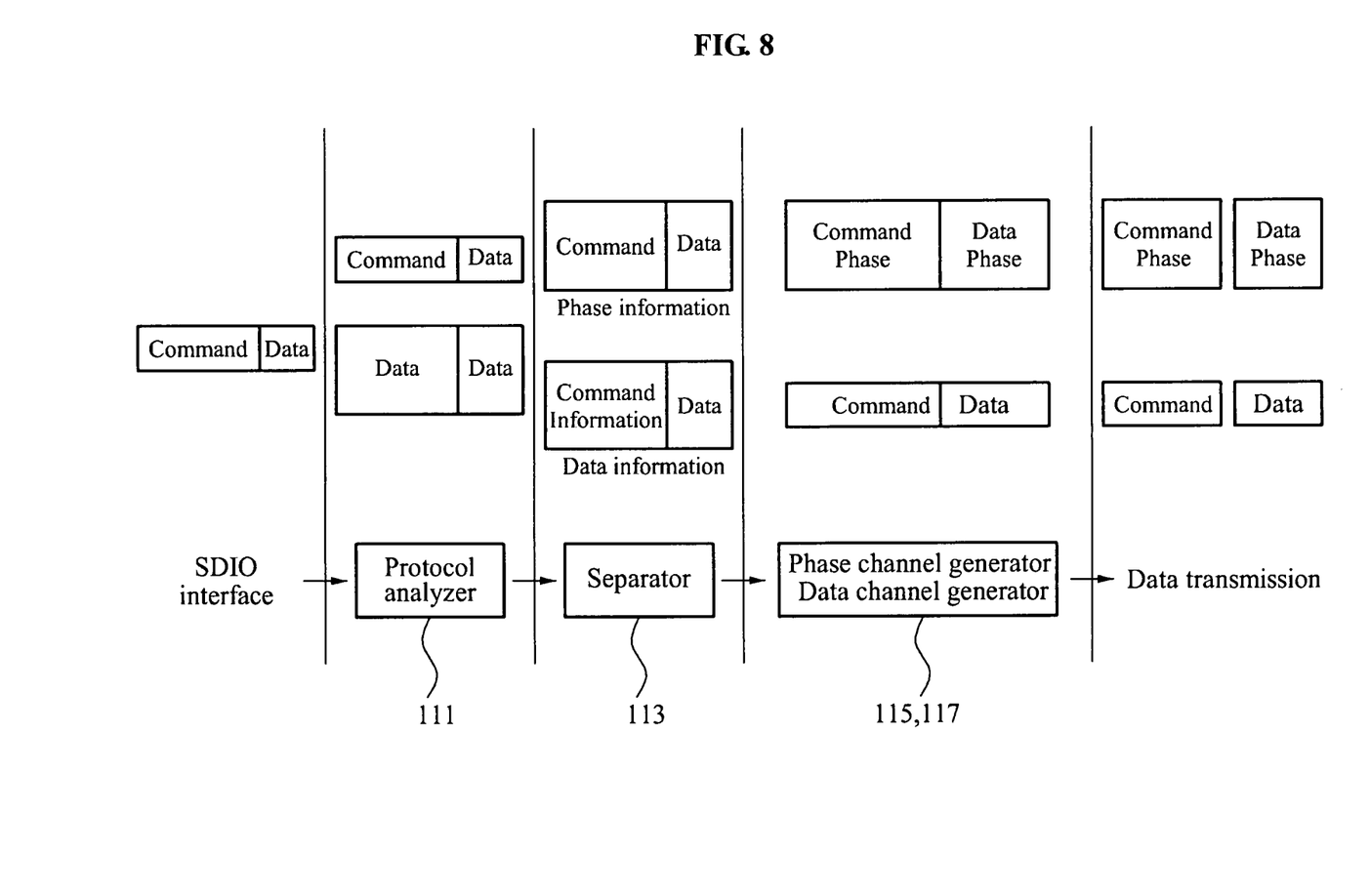
FIG. 8 illustrates an operation of converting a signal of a Secure Digital Input/Output (SDIO) interface protocol in a protocol converter according to an embodiment.

FIG. 8 illustrates an operation of converting a signal of a Secure Digital Input/Output (SDIO) interface protocol in a protocol converter according to an embodiment.

The SDIO interface protocol may be used when data is transmitted between chips, and may be used as an interface of an external memory card. The protocol converter 110 may define a phase of an on-chip bus protocol interface, as well as phases of various protocols connected to an external device, and may convert a protocol interface.

Data of the SDIO protocol may include a plurality of sub-data, for example, command data and actual data. In FIG. 8, the command data and the actual data may be input to the protocol analyzer 111 through different signal lines.

The protocol analyzer 111 may analyze the input data of the SDIO interface protocol, and may determine that phases "command" and "data_occur."

The separator 113 may separate a signal received from the protocol analyzer 111 into phase information "command" and "data, and protocol data, and may separate the protocol data into a plurality of sub-data, for example command information and data. The separator 113 may simultaneously transmit a command phase and command data corresponding to the command phase to the phase channel generator 115 and the data channel generator 117, respectively. Also, the separator 113 may simultaneously transmit a data phase and actual data corresponding to the data phase to the phase channel generator 115 and the data channel generator 117, respectively.

The command phase and the command data may be transmitted from the phase channel generator 115 and the data channel generator 117 to an external device. Then, the data phase and the actual data may be sequentially transmitted from the phase channel generator 115 and the data channel generator 117 to an external device.

Figure 9:
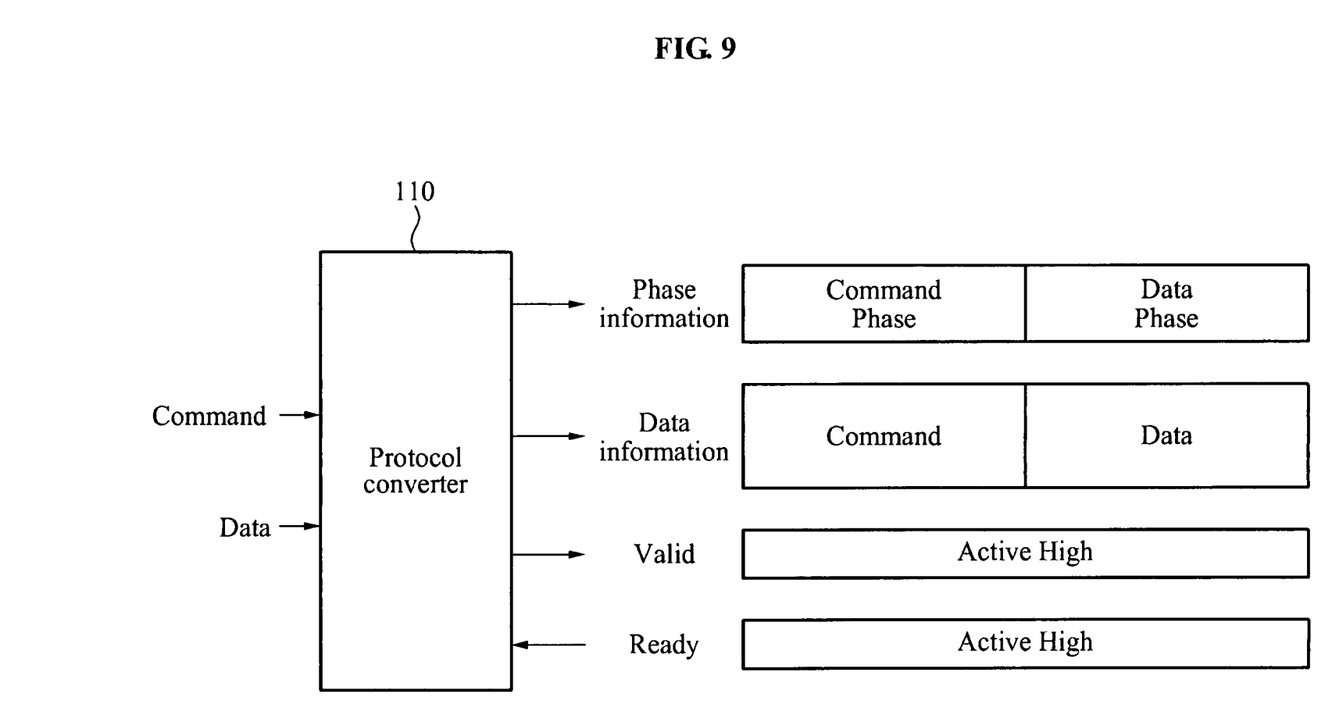
FIG. 9 illustrates an example where an SDIO interface protocol is converted based on phase information of a protocol converter and data is transmitted according to an embodiment.

FIG. 9 illustrates an example where an SDIO interface protocol is converted based on phase information of a protocol converter and data is transmitted according to an embodiment.

When an input command is activated to a high level, the protocol converter 110 may generate a command phase, and may simultaneously transmit the generated command phase and command data corresponding to the command phase to an external device using the phase channel line 120 and the data channel line 130, respectively.

Alternatively, when an input command is activated to a low level, the protocol converter 110 may generate a data phase, and may simultaneously transmit the generated data phase and actual data corresponding to the data phase to an external device using the phase channel line 120 and the data channel line 130, respectively.

As shown in FIG. 9, the protocol converter 110 may define the command phase and the data phase to convert a write data protocol of the SDIO interface protocol.

Hereinafter, a method of converting a protocol interface configured as described above will be described with reference to FIG. 10.

Figure 10:
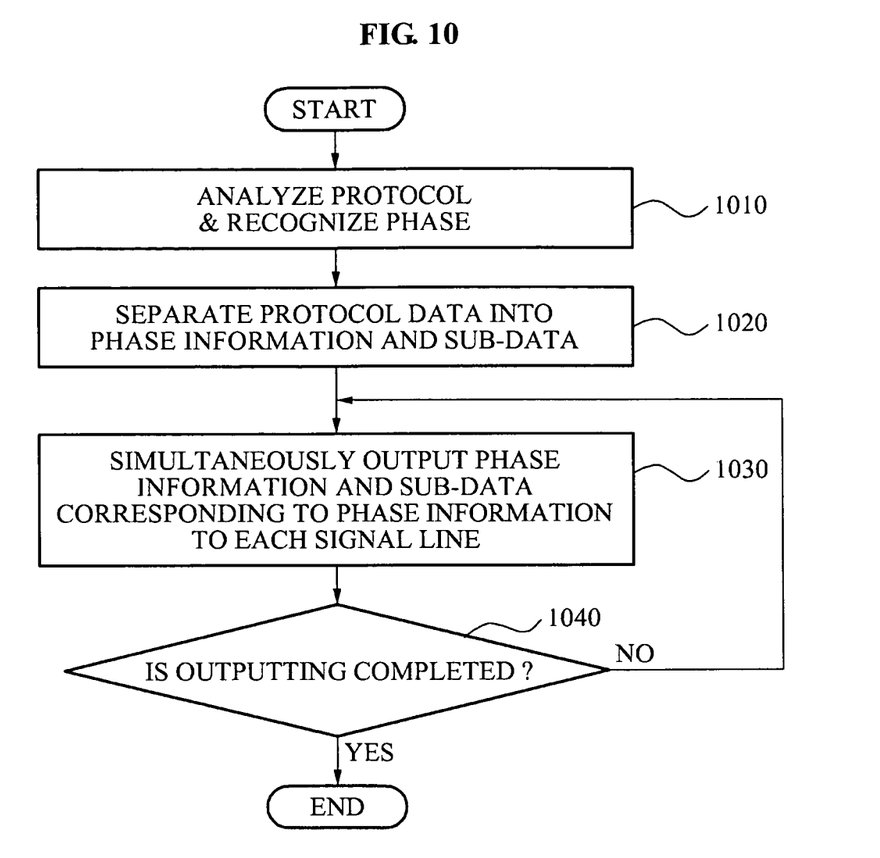
FIG. 10 illustrates a flowchart of a protocol interface converting method according to embodiments.

FIG. 10 illustrates a flowchart of a protocol interface converting method according to embodiments.

Referring to FIG. 10, in operation 1010, the protocol analyzer 111 may analyze a protocol of input protocol data and may recognize that a phase corresponding to the protocol occurs.

In operation 1020, the separator 113 may separate a signal received from the protocol analyzer 111 into phase information and protocol data, and may separate the protocol data into a plurality of sub-data based on an attribute and type of the protocol data. In this instance, a plurality of sub-phase information generated by the separator 113 may be sequentially transferred to the phase channel generator 115, and the plurality of sub-data respectively corresponding to the sub-phase information may be sequentially transferred to the data channel generator 117.

In operation 1030, the phase channel generator 115 and the data channel generator 117 may simultaneously output the sub-phase information and the sub-data corresponding to the phase information to the phase channel line 120 and the data channel line 130, respectively.

In operation 1040, when outputting of the phase information and sub-data is not completed, the protocol converter may repeat operations 1030 and 1040.

According to an embodiment, the protocol interface converting apparatus 100 may use phase information to convert a protocol interface so that a variety of interfaces differing according to the type of protocols may be combined in a single interface. Also, the protocol interface converting apparatus 100 may appropriately define a phase for each protocol, and may transmit a parallel transmission interface and a sequential transmission interface using a signal line of a protocol converter.

Also, a conventional converter for converting between an AXI protocol and an AHB protocol is not able to support an out-of-order function of the AXI protocol, because the AHB protocol is not able to support the out-of-order function of the AXI protocol when a parallel data transmission method is changed to a sequential data transmission method. However, the protocol converter according to the embodiments may perform the same protocol interface conversion method so that data may be transmitted using the parallel data transmission method (for example, an AXI protocol), the sequential data transmission method (for example, an AHB protocol), or a data transmission between chips (for example, an SDIO interface protocol).

According to the embodiments, a protocol converter using phase information may convert a protocol interface so that protocols using a parallel data transmission method may be connected, or a protocol using the parallel data transmission method and a protocol using a sequential data transmission method may be connected. Also, the protocol converter may connect external protocol interfaces using the same signal line.

Also, according to the embodiments, different protocol interfaces may be converted to a single protocol interface having the same signal line without limiting a specification of a protocol, and thus there is no need for a plurality of converters.

Also, a conventional protocol interface conversion causes a predetermined function to be unavailable, whereas all functions provided by a protocol may be used according to the embodiments.

The methods according to the above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An apparatus for converting an interface protocol, the apparatus comprising:
    a protocol converter to analyze a protocol of input protocol data, and to sequentially output a plurality of sub-data of the input protocol data according to types of the plurality of sub-data, to output the plurality of sub-data and a plurality of phase information representing the types of the plurality of sub-data;
    a phase channel line to transmit phase information received from the protocol converter among the plurality of phase information; and
    a data channel line to transmit the sub-data corresponding to the phase information when the phase information is transmitted to the phase channel line.

2. The apparatus of claim 1, wherein, when the input protocol data contains a valid signal, the protocol converter generates phase information corresponding to the protocol.

3. The apparatus of claim 1, wherein the protocol converter comprises:
    a protocol analyzer to analyze the protocol of the input protocol data and to determine an occurrence of a phase corresponding to the protocol;
    a separator to separate the input protocol data into the plurality of sub-data based on a result of the determining, and to sequentially output the plurality of sub-data and a plurality of phase information respectively corresponding to the plurality of sub-data; and
    a phase channel generator to output, to the phase channel line, phase information received from the separator among the plurality of phase information; and
    a data channel generator to output, to the data channel line, a sub-data corresponding to the received phase information among the plurality of sub-data.

4. The apparatus of claim 1, wherein each of the plurality of sub-data comprises at least one of information data, address data, and actual data, and each of the plurality of phase information comprises at least one of an information phase, an address phase, and a data phase.

5. The apparatus of claim 4, wherein, when at least two channel data are input in parallel through at least two channels, the protocol converter sequentially outputs a plurality of phase information corresponding to a plurality of sub-data of the at least two channel data, the plurality of sub-data being output simultaneously with the plurality of phase information.

6. The apparatus of claim 4, wherein the protocol converter combines the information phase and the address phase in a phase information by expanding the data channel line, and outputs the information data and the address data to the data channel line when the combined phase information is output to the phase channel line.

7. The apparatus of claim 1, wherein the protocol comprises an Advanced eXtensible Interface (AXI) protocol using a parallel data transmission method.

8. The apparatus of claim 1, wherein the protocol converter defines different phase information based on a type of a transmission method.

9. The apparatus of claim 1, wherein the protocol comprises an Advanced High-performance Bus (AHB) protocol using a sequential data transmission method.

10. The apparatus of claim 1, wherein each of the plurality of sub-data comprises command data and actual data, and each of the plurality of phase information comprises a command phase and an actual data phase.

11. The apparatus of claim 1, wherein the protocol comprises a Secure Digital Input/Output (SDIO) interface protocol using a data transmission between chips.

12. A method for converting an interface protocol, the method comprising:

analyzing a protocol of input protocol data, and determining an occurrence of a phase corresponding to the protocol;

separating the input protocol data into a plurality of sub-data based on a result of the determining; and sequentially outputting, to a phase channel line, a plurality of pieces of phase information respectively corresponding to the plurality of pieces of sub-data; and sequentially outputting, to a data channel line, the plurality of pieces of sub-data when the plurality of pieces of phase information are output to the phase channel line.

13. The method of claim 12, wherein the plurality of phase information is sequentially output.

14. The method of claim 12, wherein the plurality of sub-data is sequentially output.

15. The method of claim 12, the plurality of phase information and the plurality of sub-data are outputted simultaneously.

16. A method of protocol conversion for a bus, comprising:

analyzing a protocol of incoming protocol information;

separating the protocol information into data and phase information where the data comprises one or more data items and the phase information comprises corresponding phase items responsive to the analysis;

generating output data for a data channel of the bus from the data items;

generating phase signals for a phase channel of the bus from the corresponding phase items; and applying the output data to a data channel line according to the phase signals of the phase channel.

* * * * *